(12) United States Patent
Youn et al.

(10) Patent No.: US 6,525,221 B1
(45) Date of Patent: Feb. 25, 2003

(54) FUEL DETERGENT COMPOSED OF HYDROPOLY(OXYALKYLENE) OXYALKYL AMINE COMPOUND

(75) Inventors: Hyun-Ki Youn, Daejeon (KR); Myeong-Seok Kim, Daejeon (KR); Byung-Keel Sohn, Daejeon (KR); Jae-Hoon Uhm, Daejeon (KR); Byeong-Gyu Lim, Daejeon (KR)

(73) Assignee: Daelim Industrial Co., Ltd., Seoul (KR)

( * ) Notice: Subject to any disclaimer, the term of this patent is extended or adjusted under 35 U.S.C. 154(b) by 0 days.

(21) Appl. No.: 09/979,296

(22) PCT Filed: May 25, 2000

(86) PCT No.: PCT/KR00/00536

§ 371 (c)(1),
(2), (4) Date: Nov. 21, 2001

(87) PCT Pub. No.: WO00/75264

PCT Pub. Date: Dec. 14, 2000

(30) Foreign Application Priority Data

May 25, 1999 (KR) ............................................. 99/18908

(51) Int. Cl.$^7$ .......................... C10L 1/22; C07C 211/07; C07C 211/08; C07C 211/09; C07C 211/13
(52) U.S. Cl. ........................ 564/434; 564/503; 564/504; 564/505; 510/185; 44/433
(58) Field of Search ................................ 564/434, 503, 564/504, 505; 510/185; 44/433

(56) References Cited

U.S. PATENT DOCUMENTS 5,306,315 A * 4/1994 Cherpeck ..................... 44/424

* cited by examiner

*Primary Examiner*—Brian Davis
(74) *Attorney, Agent, or Firm*—Staas & Halsey LLP

(57) ABSTRACT

A fuel oil detergent which efficiently constricts precipitate formation and octane number requirement increase in a carburetor, injector, and inlet system of an internal combustion engine, i.e., a hydropoly(oxyalkylene) oxyalkyl amine based compound, a process for preparing the compound, and a fuel oil composition including the compound.

10 Claims, No Drawings

FUEL DETERGENT COMPOSED OF HYDROPOLY(OXYALKYLENE) OXYALKYL AMINE COMPOUND

CROSS REFERENCE TO RELATED APPLICATIONS

This application is based on application No. 10-1999-0018908 filed in the Korean Industrial Property Office on May 25, 1999, the content of which is incorporated hereinto by reference.

BACKGROUND OF THE INVENTION (a) Field of the Invention

The present invention relates to hydropolyoxyalkylene oxyalkyl amine compounds useful as a novel fuel oil detergent, more particularly to hydropolyoxyalkylene oxyalkyl amine compounds useful as a novel fuel oil detergent, which can efficiently inhibit both the formation of deposits in the carburetor, injector and intake valve of internal combustion engines and octane number required value increases (ORI) by incorporating the active detergent into the fuel, and a process for preparing the same and a fuel oil composition comprising the same.

(b) Description of the Related Art

It has been known that deposits are formed on the surface of injectors, intake valves, carburetors, etc., of internal combustion engines by the oxidation of the fuel and lubricant oil. These deposits formed in the intake valve block a mixed gas flow which enters a combustion chamber, thereby causing severe drive-ability problems such as misfire and poor acceleration and can significantly increase an automobile's fuel consumption and produce harmful exhaust pollutants. Furthermore, the deposits formed in a combustion chamber can create mechanical damage to a piston, piston ring, engine head, etc.

Conventionally, an aliphatic amine compound based on long-chained hydrocarbons has been developed and used as a fuel oil detergent in order to inhibit the formation of these deposits. It is disclosed in U.S. Pat. Nos. 3,438,757 and 3,574,576 that hydrocarbyl amines having a molecular weight of 425 to 10,000, preferably 450 to 5,000, are useful as a fuel oil detergent or a lubricating oil dispersing agent of internal combustion engines. Furthermore, it is disclosed in European Patent No. 476,485 A that polybutylaminoalcohol prepared by reacting amine with polybutene epoxide obtained by epoxidizing polybutene is useful as a detergent for the gasoline and as an additive to the lubricant oil. The polybutylaminoalcohol is produced by a nucleophilic substitution reaction of polybutene epoxide with amine.

However, there are problems in that the octane number required value of an engine increases since the above detergents increase the formation of deposits in a combustion chamber, although they have effects of inhibiting the formation of deposits on the surface of the intake valve. Deposits formed on the combustion chamber surface increase the temperature of a combustion chamber by hindering heat transfer between an engine cooling system and the combustion chamber, provoking engine knock by inducing pre-ignition.

Furthermore, a high compression ratio occurs resulting in an engine knock since the volume of the combustion chamber is decreased when deposits are formed on the surface of the combustion chamber. Knocking phenomena can cause damage to pistons, connecting rods, bearings, cam pushrods, etc., if it continues for a long period of time and (it can cause) energy inefficiency.

As described in the above, an octane number required value increase phenomena of an engine occurs when deposits are formed in the combustion chamber, and a fuel having a high octane number should be used so as to prevent the knocking phenomena from occurring in case of an engine having a high octane number required value increase. However, the knocking phenomena can be prevented without using a fuel having a high octane number when the octane number required value increase of the engine is decreased by inhibiting or preventing the formation of deposits in the combustion chamber.

SUMMARY OF THE INVENTION

Therefore, it is an object of the present invention to provide a hydropolyoxyalkylene oxyalkyl amine compound as a novel fuel oil detergent which has superior intake valve cleaning effects and inhibits or prevents octane number required value increases.

Furthermore, it is another object of the present invention to provide a process for preparing the hydropolyoxyalkylene oxyalkyl amine compounds.

In order to accomplish the above objects, the present invention provides a hydropolyoxyalkylene oxyalkyl amine compound as a novel fuel oil detergent.

Furthermore, the present invention provides a fuel oil concentrate comprising the hydropolyoxyalkylene oxyalkyl amine compound.

Furthermore, the present invention provides a fuel oil composition comprising the hydropolyoxyalkylene oxyalkyl amine compound and/or concentrate.

Furthermore, the present invention provides a preparation process in which the hydropolyoxyalkylene oxyalkyl amine compound is prepared.

DETAILED DESCRIPTION OF THE PREFERRED EMBODIMENTS

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the description is to be regarded as illustrative in nature, and not restrictive.

The present invention is described in detail as follows.

As a hydropolyoxyalkylene oxyalkyl amine compound, a novel fuel oil detergent of the present invention has a structure such as the following Chemical Formula 1 of which the molecular weight is preferably from 200 to 6,000.

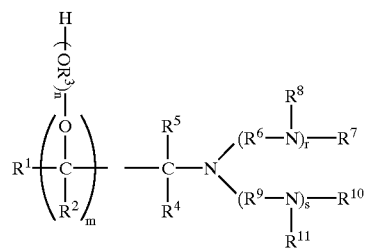

where m is an integer from 1 to 10, preferably an integer from 1 to 2;

n is an integer from 1 to 80, preferably an integer from 1 to 50;

r and s, each of which can be the same or different, are each independently an integer from 0 to 10, preferably an integer from 0 to 3;

$R^1$ is an alkyl derived from polyolefin having a molecular weight from 200 to 5,000, preferably an alkyl derived from polyolefin having a molecular weight from 200 to 2,500;

$R^2$, $R^4$, and $R^5$, each of which can be the same or different, are each independently hydrogen or alkyl having 1 to 10 carbon atoms, preferably alkyl having 1 to 2 carbon atoms;

$R^3$, as a repetition unit of a polymer chain which can be the same or different between repetition units, is alkylene having 2 to 10 carbon atoms, preferably alkylene having 2 to 5 carbon atoms;

$R^6$ and $R^9$, each of which can be the same or different, are each independently hydrocarbons comprising aromatic chains having 6 to 10 carbon atoms or alkylenes having 2 to 10 carbon atoms, preferably alkylenes having 2 to 6 carbon atoms; and $R^7$, $R^8$, $R^{10}$, and $R^{11}$, each of which can be the same or different, are each independently hydrogen, hydrocarbons comprising aromatic chains having 6 to 10 carbon atoms, alkyls having 1 to 10 carbon atoms, or hydropolyoxyalkylene(oxyalkylene) of the following Chemical Formula 2:

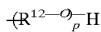

where p is an integer from 0 to 80, preferably an integer from 0 to 50; and $R^{12}$, as a repetition unit of polymer chains which can be the same or different between repetition units, is a hydrocarbon comprising aromatic chains having 6 to 10 carbon atoms or alkylenes having 2 to 10 carbon atoms, preferably alkylene having 2 to 5 carbon atoms.

A process for preparing a hydropolyoxyalkylene oxyalkyl amine based compound of the present invention consists of reacting hydroxyalkyl amine of the following Chemical Formula 3 with alkyleneoxide having 2 to 10 carbon atoms, preferably 2 to 5 carbon atoms:

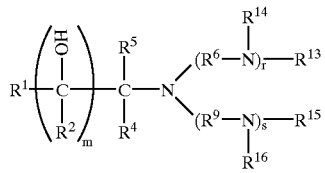

where m is an integer from 1 to 10, preferably an integer from 1 to 2;

r and s, each of which can be the same or different, are each independently an integer from 0 to 10, preferably an integer from 0 to 3;

$R^1$ is alkyl derived from polyolefin having a molecular weight from 200 to 5,000, preferably alkyl derived from polyolefin having a molecular weight from 200 to 2,500;

$R^2$, $R^4$, and $R^5$, each of which can be the same or different, are each independently a hydrogen or alkyl having 1 to 10 carbon atoms, preferably alkyl having 1 to 2 carbon atoms;

$R^6$ and $R^9$, each of which can be the same or different, are each independently a hydrocarbon comprising aromatic chains having 6 to 10 carbon atoms or alkylenes having 2 to 10 carbon atoms, preferably alkylene having 2 to 6 carbon atoms; and $R^{13}$, $R^{14}$, $R^{15}$, and $R^{16}$, each of which can be the same or different, are each independently hydrogen, a hydrocarbon comprising aromatic chains having 6 to 10 carbon atoms, an alkyl having 1 to 10 carbon atoms, or an hydroxyalkyl of the following Chemical Formula 4:

where $R^{17}$ is a hydrocarbon comprising aromatic chains having 6 to 10 carbon atoms or alkylenes having 1 to 10 carbon atoms, preferably alkylene having 1 to 5 carbon atoms.

Preparation of Hydroxyalkyl Amine

The first step reaction is epoxidation of polyolefin. Polyolefin having a double bond forms oxirane rings by an oxidant which can cause epoxidation, thus becoming polyolefin epoxide. Polyolefin epoxide is prepared from polyolefin having an average molecular weight from 200 to 5,000, preferably from 200 to 2,500.

Polyolefin, as a mixture of molecules having generally different molecular weights, can have one or more branched chains per 6 carbon atoms, preferably one or more branched chains per 4 carbon atoms, and polyolefin having one or more branched chains per 2 carbon atoms is more preferable. These polyolefins can be prepared from olefin having 2 to 6 carbon atoms, preferably olefin having 3 to 4 carbon atoms, and isobutylene or polybutene prepared by reacting a $C_4$ distillate containing isobutylene is most preferable.

These polyolefins have double bonds, and they become polyolefin epoxide when these double bonds form oxirane rings with various oxidants. Oxidants which can be used in the preparation of polyolefin epoxide can be all notified oxidants. Preferable oxidants include hydrogen peroxide, peracetic acid, perbenzoic acid, performic acid, monoperphthalic acid, percamphoric acid, persuccinic acid, pertrifluoroacetic acid, etc., and hydrogen peroxide is more preferable.

Where hydrogen peroxide is employed, an organic acid such as formic acid or acetic acid is additionally added. Particularly, in case of using an organic acid having at least 2 carbon atoms such as acetic acid, it is desirable to add an inorganic acid such as sulfuric acid or phosphoric acid. In this case, hydrogen peroxide is added with a molar ratio of olefin to hydrogen peroxide being 1:0.2 to 1:3.0, preferably 1:0.4 to 1:1.5. The reaction is slow when a molar ratio of olefin to hydrogen peroxide is below 1:0.2, and benefits are reduced when the molar ratio exceeds 1:3.0.

Organic acids are added with a molar ratio of olefin to organic acid being 1:0.1 to 1:1.5, preferably 1:0.2 to 1:1. The rate of reaction is slow when a molar ratio of olefin to organic acid is below 1:0.1, and a side reaction occurs in which ester is produced by the reaction of produced epoxide with organic acid when the molar ratio exceeds 1:1.5.

On the other hand, inorganic acids are added with a molar ratio of olefin to inorganic acid is 1:0.1 to 1:0.6, preferably 1:0.2 to 1:0.4 in case of using organic acids having at least 2 carbon atoms including acetic acid. The rate of reaction becomes slow when a molar ratio of olefin to inorganic acid is below 1:0.1, and a side reaction occurs when the molar ratio exceeds 1:0.6.

The rate of reaction temperature is preferably from 20 to 90° C. The reaction becomes slow when the reaction temperature is below 20° C., and hydrogen peroxide is decomposed resulting in preparation process difficulties due to high temperature when it exceeds 90°.

The resulting products are washed with water to remove the oxidant and organic acid, and then are distilled in a vacuum to remove the solvent or are directly distilled in a vacuum without being washed, to obtain polyolefin epoxide.

The second step is an isomerization reaction of the polyolefin epoxide. The polyolefin epoxide produced from the first step reaction has an oxirane ring which is opened by a strong base to form a double bond and to provide a hydroxy polyolefin. Such ring-opening reaction of the alkylene epoxide can also be found in the literature (e.g., Encyclopedia of Chemical Technology, $3^{rd}$ ed., vol 18, p 633).

In this reaction, common bases publicly known can be used. Preferably, an alkali metal alkoxide or an alkali metal hydroxide obtained by the reaction of an alcohol with alkali metals can be used. More preferably, sodium alkoxide, potassium alkoxide, sodium hydroxide or potassium hydroxide can be used.

The molar ratio of the polyolefin epoxide to the base used in the reaction (with the base) is from 1:0.002 to 1:0.5, preferably from 1:0.005 to 1:0.2. The reaction becomes slow when a molar ratio of the polyolefin epoxide to the base is below 1:0.002, and an additional process for removing bases remaining is needed when the molar ratio exceeds 1:0.5.

The reaction is carried out in 100~300° C., preferably from 140 to 250° C. The rate of reaction becomes slow when the reaction temperature is below 100° C., and facility corrosion is caused by bases when it exceeds 300° C.

Hydroxyl group substituted polyolefin is prepared after removing metallic constituents in the resulting products by washing with water or adsorbing to cation exchange resin, etc. Excess amount of an alcoholic component is distilled off at reduced pressure to provide hydroxypolyolefin.

In the third step reaction, hydroxypolyolefin epoxide is prepared by expoxidizing double bonds in hydroxypolyolefin prepared in the second step reaction in the same way as in the first step reaction.

On the other hand, one or more hydroxyl groups substituted polyolefin epoxide is produced when the second and third step reactions are repeated, and two or more hydroxyl groups substituted polyalkenyl amine (one or more hydroxyl groups substituted polyalkenyl amine is hereinafter referred to as "hydroxyalkyl amine") is produced when one or more hydroxyl groups substituted polyolefin epoxide is reacted with the fourth step amine.

The fourth step reaction is the reaction of polyolefin epoxide prepared from the first step reaction or hydroxypolyolefin epoxide prepared from the third step reaction with amine. Polyolefin epoxide or hydroxypolyolefin epoxide can be represented in the following Chemical Formula 5, and hydroxyalkyl amine is produced by the ring-opening reaction of polyolefin epoxide or hydropolyolefin epoxide and amines. Furthermore, the amine is represented in the following Chemical Formula 6. One hydroxyl group exists as hydroxyalkyl amine prepared by omitting the second and third step reactions and reacting polyolefin epoxide produced from the first reaction with amine, and two or more hydroxyl groups exist as hydroxyalkyl amines produced by reacting hydroxypolyolefin epoxide with amine.

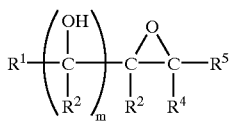

where m is an integer from 1 to 10, preferably an integer from 1 to 2;

$R^1$ is an alkyl derived from polyolefin having a molecular weight from 200 to 5,000, preferably an alkyl derived from polyolefin having a molecular weight from 200 to 2,500; and $R^2$, $R^4$, and $R^5$, each of which can be the same or different, are each independently hydrogen or alkyl having 1 to 10 carbon atoms, preferably hydrogen or alkyl having 1 to 2 carbon atoms.

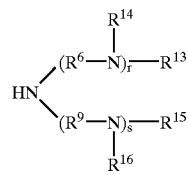

where $R^6$ and $R^9$, each of which can be the same or different, are each independently hydrocarbons comprising aromatic chains having 6 to 10 carbon atoms or alkylenes having 2 to 10 carbon atoms, preferably alkylenes having 2 to 6 carbon atoms; and $R^{13}$, $R^{14}$, $R^{15}$, and $R^{16}$, each of which can be the same or different, are each independently hydrogen, hydrocarbons comprising aromatic chains having 6 to 10 carbon atoms, alkyls having 1 to 10 carbon atoms, or hydroxyalkyl of the Chemical Formula 4.

Amines used to prepare hydroxypolyalkenyl amine compounds have one or more basic nitrogen atoms with one or more hydrogen atoms, and they include one or more compounds selected from the group consisting of ammonia, ethylenediamine, hexamethylenediamine, diethylenetriamine, triethylenetetraamine, di(trimethylene)triamine, dipropylenetriamine, tetraethylenepentaamine, 1,2-propylenediamine, 1,3-propylenediamine, dimethylaminopropylenediamine, dipropylenetriamine, 2-aminoethanol, 2-(2-aminoethylamino)ethanol, 1-amino-2-propanol, 3-amino-i-propanol, 4-aminophenol, N-methylamine, N-ethylamine, N-n-propylamine, N-isopropylamine, N-n-butylamine, N-isobutylamine, N-sec-butylamine, N-tert-butylamine, N-n-phentylamine, N-cyclophentylamine, N-n-hexylamine, N-cyclohexylamine, N,N-dimethylamine, N,N-diethylamine, N-di-n-propylamine, N,N-diisopropylamine, N,N-di-n-butylamine, N,N-diisobutylamine, N,N-di(2-hydroxyethyl)amine, N,N-di(3-hydroxypropyl)amine, N,N-di(ethoxyethyl)amine, N, N-di(propoxyethyl)amine, preferably ethylenediamine, diethylenetriamine, triethylenetetraamine or 2-aminoethanol.

The reaction of polyolefin epoxide, hydroxypolyolefin epoxide, or a mixture thereof (hereinafter referred to as "polyolefin epoxide, etc.") with the amine constituent is generally conducted at a temperature from 100 to 280° C., preferably purely conducted or with solvents, at a temperature from 180 to 250° C. The rate of reaction becomes slow below 100° C. of reaction temperature, and there are no further yield increase effects even when it exceeds 280° C. The reaction pressure is generally determined by reaction temperature, presence or absence of the solvent (whether or not solvents exist), and boiling point of the amine constituent.

It is desirable that the molar ratio of the polyolefin epoxide to amine is from 1:1 to 1:10 and that a large quantity of amine is employed to suppress desirably substituting a great deal of polyalkenyl groups for protons of an amine. However, the reactor efficiency is dropped when the molar ratio exceeds 1:10.

The reaction of the polyolefin epoxide and the amine can be carried out in the presence of a catalyst in the state where oxygen does not exist. As a suitable catalyst, a Lewis acid such as trichloroaluminium, trifluoroboron, tetrachlorotitanium or ferric chloride, or a solid catalyst containing a moiety of Lewis acid and Bronsted acid such as alumina, silica, silica alumina and also an organic acid and water, can be used.

Furthermore, the reaction can be conducted with or without a reaction solvent. The solvent is generally used when it is necessary to reduce the viscosity of the reaction product. The solvent if used should be stable and inactive to the reactants and the product. Preferable solvents include aliphatic, aromatic hydrocarbon or aliphatic alcohols.

Reaction temperature can be varied according to whether or not polyolefin epoxide, hydroxypolyolefin epoxide, amine or a catalyst is used. A reaction time is from 1 to 30 hours, preferably from 2 to 20 hours.

When the reaction is completed, the reaction mixture is extracted with a solvent of hydrocarbon-water or hydrocarbon-alcohol-water to remove the residual amine salt or un-reacted amine. The solvent is then distilled and removed under reduced pressure to separate possibly the product. Alternatively, the reaction mixture can be directly distilled off under reduced pressure to remove the residual amine and solvent.

Preparation of a Hydropolyoxyalkylene Oxyalkyl Amine Compound

A hydropolyoxyalkylene oxyalkyl amine compound of Chemical Formula 1 used as a fuel oil detergent of the present invention is prepared by the reaction of hydroxyalkyl amines of Chemical Formula 3 with alkyleneoxides having 2 to 10 carbon atoms, preferably alkyleneoxides having 2 to 5 carbon atoms.

Alkyleneoxide polymerization is initiated from hydroxyl groups in a hydroxyalkyl amine of Chemical Formula 3 and partial primary or secondary amine(s) with catalysts as in the general polyether preparation process by the initiation reaction of the hydroxy compound (R—OH) or amine compound (U.S. Pat. No. 2,841,479; U.S. Pat. No. 2,782,240; and Kirk-Othmer "Encyclopedia of Chemical Technology", vol. 18, p616).

A homogeneous polymer like a hydropolyoxypropylene oxyalkyl amine is produced when a single compound such as alkyleneoxide, for example only one type of the compound propyleneoxide, is used. However, a copolymer is easily obtained when a mixture of two or more types, for example a mixture of propyleneoxide and butyleneoxide, is reacted with a hydroxy compound.

Furthermore, a random copolymer is obtained if reactivities of the alkyleneoxide used are each similar while a block copolymer is obtained if a high reactive material such as ethyleneoxide becomes a copolymer. In case of preparing a block copolymer, generally a hydroxy compound is reacted first with alkyleneoxide, and again with another alkyleneoxide, repeatedly.

A hydropolyoxyalkylene oxyalkyl amine compound can be prepared by reacting hydroxyalkyl amine with one or more compounds selected from the group consisting of alkyleneoxides having 2 to 10 carbon atoms, preferably one or more compounds selected from the group consisting of alkyleneoxides having 2 to 5 carbon atoms. Therefore, a hydropolyoxyalkylene chain in a hydropolyoxyalkylene oxyalkyl amine compound of the present invention can be a homogeneous polymer of alkyleneoxide, a random copolymer, or a block copolymer.

Catalysts which are used to prepare a hydropolyoxyalkylene oxyalkyl amine compound include alkaline metal compounds or alkali earth metal compounds, preferably potassium hydroxide, sodium hydroxide, potassium, potassium alkoxide or sodium alkoxide, more preferably potassium hydroxide and sodium hydroxide.

The reaction of hydroxyalkyl amines and alkyleneoxides is conducted without oxygen and with catalysts at a temperature from 60 to 200° C., preferably purely conducted or under the existence of solvents, at a temperature from 80 to 150° C. The rate of reaction becomes slow when the reaction temperature is below 60° C. while a side reaction occurs when it exceeds 200° C. The reaction pressure is different according to boiling points of solvents or alkyleneoxide used, and depends on the solvent and alkyleneoxide constituents having a low boiling point.

A somewhat yellow colored hydropolyoxyalkylene oxyalkyl amine compound can be obtained by removing catalysts using adsorbent or ion exchange resin or washing with water and removing unreacted alkyleneoxide and solvents with reduced pressure distillation after the termination of reaction.

Fuel Oil Detergent Concentrate and Fuel Oil Detergent Composition

A fuel detergent of the present invention is used by adding it to hydrocarbon fuels so as to effectively inhibit both the formation of deposits in carburetors, injectors and inlet systems of internal combustion engines as well as octane number required value increases. Concentration of a detergent for maintaining engine cleanliness is determined depending on fuel type, engine type and whether or not other fuel additives exist.

Generally, a hydropolyoxyalkylene oxyalkyl amine compound used as a fuel oil detergent of the present invention is used in a hydrocarbon fuel in a concentration from 50 to 5,000 ppm by weight, preferably in a concentration from 100 to 3,000 ppm by weight. Cleaning effects are minor when the concentration is below 50 ppm by weight while synergy effects of increased addition do not exist when it exceeds 5,000 ppm by weight. A boiling point of a hydrocarbon fuel is preferably between a boiling point of gasoline and that of diesel.

The detergent of the present invention may be formulated as a concentrate, using an inert stable oleophillic organic solvent having a boliling point from about 65 to 205° C. Preferably, aliphatic or aromatic hydrocarbon solvents can be used as a solvent in a fuel oil detergent concentrate, and benzene, toluene, xylene, or an aromatic material having a higher boiling point than benzene can be used as the aromatic solvent.

The amount of the detergent constituent hydropolyoxyalkylene oxyalkyl amine compound in the concentrate is from 10 to 90% by weight, preferably from 30 to 80% by weight. Concentration effects are difficult to be expected when the content is below 10% by weight while it is difficult to transfer products due to viscosity increase when it exceeds 90% by weight.

A fuel oil detergent of the present invention can be used in the fuel together with other kinds of ususal additives. Octane number improver such as MTBE, antioxidants, antiknocking agents, a demulsifier, etc., can be used together in gasoline fuel, and they can be used in diesel fuel together with other notified additives such as a pour point depressnat, a flow improver, a cetane number improver, etc.

A fuel oil detergent of the present invention can be employed with a fuel-soluble nonvolatile carrier oil. Such a carrier oil can be selected from a poly(oxyalkylene) derivative, a mineral oil, polyalkene, etc. The carrier oil is considered as to support the inhibition of the formation of deposits when used together with a detergent for the fuel, and can provide a synergistic effect to inhibit the formation of deposits when used together with the fuel detergent of the present invention. The carrier oil is added generally in the amount of 100 to 5,000 ppm by weight, preferably 200~2,000 ppm by weight relative to the hydrocarbon fuel. The liquid carrier oil can be used additively with the fuel detergent concentrate in the amount of 20~60% by weight, preferably 30~50% by weight.

The present invention is described more in detail as follows.

The following EXAMPLES are only for exemplifying the present invention, but the present invention is not limited to the EXAMPLES.

PREPARATION EXAMPLE 1

Preparation of Polybutene Epoxide 200 g of polybutene (Daelim polybutene PB-900, molecular weight 920), 100 g of xylene, and 10.2 g of formic acid were introduced into a 500 ml flask equipped with a condenser, and agitated. 15 g of 60% hydrogen peroxide was added through an injection pump for one hour while maintaining a temperature in the flask at 50° C. and the reactants were reacted for 4 hours.

After separating the aqueous layer in the mixture using a 1,000 ml separating funnel when the epoxidation reaction was completed, the solvent of the organic layer was distilled off under a reduced pressure to obtain 195 g of slightly yellowish polybutene epoxide. The formation of epoxide was confirmed by nuclear magnetic resonance (NMR) detection. The yield of the polybutene epoxide was 96% by weight. When the resultant product was subjected to a column chromatography on silica gel, the un-reacted polybutene was eluted by n-hexane. The yield of the polybutene epoxide can be determined by measuring the weight of the eluted portion after distilling off the n-hexane.

PREPARATION EXAMPLE 2

Preparation of Polybutene Epoxide

When polybutene epoxide was prepared using 200 g of polybutene (Daelim polybutene PB-680, molecular weight 680), 100 g of xylene, 13.5 g of formic acid, and 20 g of 60% hydrogen peroxide in the same method as in PREPARATION EXAMPLE 1, the yield was 97% by weight.

PREPARATION EXAMPLE 3

Preparation of Polybutene Epoxide

When polybutene epoxide was prepared using 253 g of polybutene (Daelim polybutene PB-450, molecular weight 450), 100 g of heptane, 25.8 g of formic acid, and 38 g of 60% hydrogen peroxide in the same method as in PREPARATION EXAMPLE 1, the yield was 91% by weight.

PREPARATION EXAMPLE 4

Preparation of Hydroxypolybutene 130 g of polybutene epoxide prepared in the PREPARATION EXAMPLE 1 and a solution in which 0.8 g of potassium hydroxide were dissolved into 40 g of isopropyl alcohol were introduced into a high pressure reactor to be reacted under nitrogen atmosphere at 200° C. for 3 hours. When the reaction was completed, the reaction mixture was introduced into a 500 ml liquid separating funnel and then 200 ml of petroleum ether was added to the funnel. The mixture was washed with 200 ml of water twice to remove potassium.

The reaction mixture completely washed was distilled to remove alcohol and the solvent under reduced pressure, 128 g of yellow hydroxypolybutene was obtained. The formation of the hydroxypolybutene was recognized through the detection of a double bond by NMR and hydroxy group by FT-IR. The hydroxyl value in the resultant product was 39.

PREPARATION EXAMPLE 5

Preparation of Hydroxypolybutene

Hydroxypolybutene was prepared in the same method as in the PREPARATION EXAMPLE 4 using polybutene epoxide prepared in the PREPARATION EXAMPLE 2, and the hydroxyl value of the resultant product was 48.4.

PREPARATION EXAMPLE 6

Preparation of Hydroxypolybutene Epoxide

Hydroxypolybutene epoxide was prepared by reacting 100 g of hydroxypolybutene prepared in the PREPARATION EXAMPLE 4, 50 g of xylene, 5 g of formic acid, and 9 g of 60% hydrogen peroxide in the same method as in the PREPARATION EXAMPLE 1. The formation of hydroxypolybutene epoxide could be confirmed by NMR analysis, and the yield of the epoxide was 94%.

PREPARATION EXAMPLE 7

Preparation of Hydroxypolybutene Epoxide

Hydroxypolybutene epoxide was prepared using hydroxypolybutene prepared in the PREPARATION EXAMPLE 5 in the same method as in the PREPARATION EXAMPLE 6, the yield of the epoxide was 94%.

PREPARATION EXAMPLE 8

Preparation of Dihydroxypolybutenyl Amine 80 g of hydroxypolybutene epoxide prepared in the PREPARATION EXAMPLE 6, 30 g of diethyltriamine, and 3 g of water were introduced into a high pressure reactor and reacted under nitrogen atmosphere at 230° C. for 4 hours. Dihydroxy polybutenyl amine was obtained by removing unreacted amine at 200° C. and 100 torr for one hour with a reduced pressure distillation method while generating nitrogen bubbles after the reaction termination.

The amount of polybutene-derived amine compound in the resultant product was determined by column chromatography on silica gel. Elution with n-hexane/diethylether (1:1, v/v) gave the un-reacted polybutene and derivatives thereof which were not combined to the amine. The amount of the polybutene-derived amine compounds can be determined by measuring the weight of the residual portion after distilling off the n-hexane and diethylether.

As the results of analysis, the amount of polybutene-derived amine compound was 50% by weight and that of basic nitrogen was 1.75% of weight in the resultant product, and the hydroxyl value was 61.

PREPARATION EXAMPLE 9

Preparation of Dihydroxypolybutenyl Amine

Dihydroxypolybutenyl amine was prepared in the same method as in PREPARATION EXAMPLE 8 using 80 g of hydroxypolybutene epoxide prepared in the PREPARATION EXAMPLE 7, 40 g of diethylenetriamine, and 4 g of water. The amount of the polybutene-derived amine compound in the resultant product was 63% by weight and that of basic nitrogen was 2.95% by weight, and the hydroxyl value was 63.

PREPARATION EXAMPLE 10

Preparation of Hydroxyalkyl Amine 80 g of polybutene epoxide prepared in the PREPARATION EXAMPLE 1 and 30 g of diethylenetriamine were introduced into a high pressure reactor and reacted at 230° C. for 20 hours in the same method as in PREPARATION EXAMPLE 8, thereby preparing hydroxyalkyl amine. The amount of hydroxyalkyl amine compound in the resultant prodcut was 42% by weight and that of basic nitrogen was 1.51% by weight.

PREPARATION EXAMPLE 11

Preparation of Hydroxyalkyl Amine 80 g of polybutene epoxide prepared in the PREPARATION EXAMPLE 2, 43 g of ethanolamine, and 4.3 g of water were introduced into a high pressure reactor and reacted at 230° C. for 20 hours in the same method as in PREPARATION EXAMPLE 8, thereby preparing hydroxyalkyl amine.

The amount of hydroxyalkyl amine compound in the resultant product was 42% by weight and that of basic nitrogen was 0.849% by weight.

PREPARATION EXAMPLE 12

Preparation of Hydroxyalkyl Amine 80 g of polybutene epoxide prepared in the PREPARATION EXAMPLE 2, 110 g of diethylenetriamine, and 12 g of water were introduced into a high pressure reactor and reacted at 230° C. for 3 hours in the same method as in PREPARATION EXAMPLE 8, thereby preparing hydroxyalkyl amine.

The amount of hydroxyalkyl amine compound in the resultant product was 42% by weight and that of basic nitrogen was 2.122% by weight.

PREPARATION EXAMPLE 13

Preparation of Hydroxyalkyl Amine 80 g of polybutene epoxide prepared in the PREPARATION EXAMPLE 3, 63 g of diethylenetriamine, and 3.3 g of water were introduced into a high pressure reactor and reacted at 230° C. for 4 hours in the same method as in PREPARATION EXAMPLE 8, thereby preparing hydroxyalkyl amine.

The amount of hydroxyalkyl amine compound in the resultant product was 46% by weight and that of basic oxygen was 3.276% by weight.

PREPARATION EXAMPLE 14

Preparation of Hydropolyoxypropylene Oxyalkyl Amine

After introducing 60 g of dihydroxypolybutenyl amine prepared in the PREPARATION EXAMPLE 8 and 7.15 g of 5% by weight potassium hydroxide isopropyl alcohol solution into a 300 ml high pressure reactor, isopropyl alcohol was removed from the reactor at 120° C. for 30 minutes while generating nitrogen bubbles at a rate of 600 ml/min, and the rest of the isopropyl alcohol was removed with reduced pressure distillation at 120° C. and 100 torr for 30 minutes. After lowering the isopropyl alcohol removed reactor to room temperature and adding 83 g of propylene oxide, it was reacted while increasing the reactor temperature to 120° C. The reactor temperature reached 120° C., and the reaction was terminated after 69 minutes.

After terminating the reaction, the reactor temperature was lowered to room temperature. And then, the reaction mixture was dissolved by adding 200 ml of normal-hexane, put into a 500 ml separating funnel, and washed twice with 200 ml of water thereby removing the potassium constituent.

Slightly yellowish hydropolyoxypropylene oxyalkyl amine compound was obtained by removing unreacted propylene oxide or normal-hexane in the potassium constituent removed reaction mixture with a reduced pressure distillation method at 130°.

The amount of basic nitrogen in the prepared hydropolyoxypropylene oxyalkyl amine was 0.905% by weight.

PREPARATION EXAMPLE 15

Preparation of Hydropolyoxypropylene Oxyalkyl Amine

A hydropolyoxypropylene oxyalkyl amine compound was prepared in the same method as in the PREPARATION EXAMPLE 14 using 60 g of dihydroxypolybutenyl amine prepared in the PREPARATION EXAMPLE 9 and 4.05 g of 5% potassium hydroxide isopropyl alcohol solution. The reactor temperature reached 120° C. in 50 minutes after the temperature started rising, and the reaction was terminated after 65 minutes.

The amount of basic nitrogen in the prepared hydropolyoxypropylene oxyalkyl amine was 1.75% by weight.

PREPARATION EXAMPLE 16

Preparation of Hydropolyoxypropylene Oxyalkyl Amine

A hydropolyoxypropylene oxyalkyl amine compound was prepared in the same method as in PREPARATION EXAMPLE 14 after putting 60 g of hydroxyalkyl amine prepared in the PREPARATION EXAMPLE 10, 7.15 g of 5% potassium hydroxide isopropyl alcohol solution, and 50 g of normal-hexane into a 300 ml high pressure reactor. The reactor temperature reached 120° C. in 50 minutes after the temperature started rising, and the reaction was terminated after 60 minutes.

The amount of basic nitrogen in the prepared hydropolyoxypropylene oxyalkyl amine compound was 0.780% by weight.

PREPARATION EXAMPLE 17

Preparation of Hydropolyoxypropylene Oxyalkyl Amine 80 g of hydroxyalkyl amine prepared in the PREPARATION EXAMPLE 11, 98 g of propylene oxide, and 0.223 g of 95% potassium hydroxide were put into a 300 ml high pressure reactor and reacted while raising the reactor temperature to 120° C. The reactor temperature reached 120° C. in 60 minutes after the temperature started rising, and the reaction was terminated after 120 minutes.

A slightly yellowish hydropolyoxypropylene oxyalkyl amine compound was obtained by treating the reaction mixture in the same method as in the PREPARATION EXAMPLE 14 after the reaction termination.

The amount of basic nitrogen in the prepared hydropolyoxypropylene oxyalkyl amine compound was 0.695% by weight.

PREPARATION EXAMPLE 18

Preparation of Hydropolyoxypropylene Oxyalkyl Amine 80 g of hydroxyalkyl amine prepared in the PREPARATION EXAMPLE 12, 68 g of propylene oxide, and 0.260 g of 95% potassium hydroxide were introduced into a 300° high pressure reactor and reacted while raising the reactor temperature to 130° C. The reactor temperature reached 130° in 120 minutes after the temperature started rising, and the reaction was terminated after 220 minutes.

A slightly yellowish hydropolyoxypropylene oxyalkyl amine compound was obtained by treating the reaction mixture in the same method as in the PREPARATION EXAMPLE 14 after the reaction termination.

The amount of basic nitrogen in the prepared hydropolyoxyalkylene oxyalkyl amine hydroxyalkylamine compound was 1.309% by weight.

PREPARATION EXAMPLE 19

Preparation of Hydropolyoxypropylene Oxyalkyl Amine

A hydropolyoxypropylene oxyalkyl amine was prepared in the same method as in the PREPARATION EXAMPLE 14 after introducing 60 g of hydroxyalkyl amine prepared in the PREPARATION EXAMPLE 12 and 4.20 g of 5% potassium hydroxide isopropyl alcohol solution into a 300 ml high pressure reactor. The reactor temperature reached 120° C. in 50 minutes after the temperature started rising, and the reaction was terminated after 60 minutes. The amount of basic nitrogen in the prepared hydropolyoxypropylene oxyalkyl amine was 1.297% by weight.

PREPARATION EXAMPLE 20

Preparation of Hydropolyoxypropylene Oxyalkyl Amine 60 g of hydroxyalkyl amine prepared in the PREPARATION EXAMPLE 13 and a potassium isopropoxide solution prepared by dissolving 0.234 g of potassium metal into isopropyl alcohol were introduced into a 300 ml high pressure reactor and the reactant mixture was distilled for 30 minutes to remove isopropylalcohol under reduced pressure to 100 torr at 120° C., for 30 minutes. After lowering the isopropyl alcohol removed reactor to room temperature and adding 101 g of propylene oxide, it was reacted while increasing the reactor temperature to 120° C. The reactor temperature reached 120° C. in 70 minutes after the temperature began rising, and the reaction was terminated after 190 minutes.

A slightly yellowish hydropolyoxypropylene oxyalkyl amine compound was obtained by treating the reaction mixture in the same method as in the PREPARATION EXAMPLE 14 after finishing the reaction. The amount of basic nitrogen in the prepared hydropolyoxypropylene oxyalkyl amine compound was 1.910% by weight.

Intake Valve Deposit Test of the Gasoline Engine (Sample Selection Test)

An intake valve deposit test was carried out in a simulator made by Toyota Company in Japan. The simulator is designed so that the temperature of the valve is controlled by an electric heater and flow rate of the oil ejected through the valve guide to the surface of the valve is also controlled. Thus, the simulator is known as adequate equipment for the intake valve deposit test (SAE Technical paper series 900152, "Mechanism of intake valve deposit formation part 2: simulation test", SAE Technical paper series 922265, "Mechanism of intake valve deposit formation part III: Effects of gasoline quality").

The test was undertaken for 10 hours in the conditions as in the following Table 1.

TABLE 1

| Test hour | 10 hours |
|---|---|
| Injection rate of the fuel | 100 ml/hr |
| Flow rate of the oil | 0.035 to 0.045 ml/hr |
| Valve speed | 500 rpm |
| Test cycle (Temperature of valve) | 160° C. (0.5 hr) 250° C. (0.5 hr) |

After an intake valve was separated from an engine, washed with normal-heptane, and dried, its weight was measured in 0.01 mg units, and it was then reinstalled for conducting the test. After the 10 hour test, deposits on the bottom surface were removed after separating the valve. After removing materials dissolved in normal-heptane by washing with normal-heptane and drying, the weight was measured. At this time, the difference of valve weight between before and after the test was taken as the weight of the deposit formed for the test.

EXAMPLE 1

Intake Valve Deposit Test of the Gasoline Engine

The intake valve deposit test was undertaken in the same method as in the above after preparing a fuel oil concentrate by mixing a hydropolyoxypropylene oxyalkyl amine compound prepared in the PREPARATION EXAMPLE 15 with xylene in an amount of 50% by weight and adding 400 ppm by weight of fuel oil concentrate to commercial unleaded gasoline which did not contain a detergent.

EXAMPLE 2

Intake Valve Deposit Test of the Gasoline Engine

The intake valve deposit test was undertaken in the same method as in the EXAMPLE 1 using a hydropolyoxypropylene oxyalkyl amine compound prepared in the PREPARATION EXAMPLE 17.

COMPARATIVE EXAMPLE 1

Intake Valve Deposit of the Gasoline Engine

The intake valve deposit test was undertaken in the same method as in the EXAMPLE 1 using a hydroxyamine compound prepared in the PREPARATION EXAMPLE 10.

COMPARATIVE EXAMPLE 2

Intake Valve Deposit of the Gasoline Engine

The intake valve deposit test was undertaken in the same method as in the EXAMPLE 1 by adding 400 ppm by weight of commercial gasoline detergent to a commercial unleaded gasoline which did not contain a detergent.

COMPARATIVE EXAMPLE 3

Intake Valve Deposit of the Gasoline Engine

The intake valve deposit test was undertaken in the same method as in the EXAMPLE 1 using commercial unleaded gasoline which did not contain a detergent.

The amount of deposit formed on the intake valve in shown in Table 2.

TABLE 2

| Test | Deposits on intake Valve (mg/valve) |
| --- | --- |
| EXAMPLE 1 | 0.55 |
| EXAMPLE 2 | 0.42 |
| COMPARATIVE EXAMPLE 1 | 0.61 |
| COMPARATIVE EXAMPLE 2 | 0.67 |
| COMPARATIVE EXAMPLE 3 | 20.12 |

A detergent of the present invention had superior inhibiting effects of the production of intake valve deposits as shown in the above Table 2.

The Intake Valve Deposit and Combustion Chamber Deposit Test of Gasoline Engine

The intake valve deposit and combustion chamber deposit test of the gasoline engine was undertaken on Hyundai Motor Company's Elantra engine 1.6 l DOHC and its specifications are represented in the following Table 3.

TABLE 3

| Type of Engine | DOHC 4 cylinder | Maximum Output | 126/6000 (PS/rpm) |
| --- | --- | --- | --- |
| Bore x stroke | 82.3 x 75 mm | Maximum Torque | 15.3/5000 (kg/rpm) |
| Displacement Volume | 1,596 cc | Fuel Injection Type | MPI |
| Compression Ratio | 9.2 | Maximum Speed | 180 km/hr |

The test mode used was a Benz M102E, and its test conditions are represented in the following Table 4.

TABLE 4

| Test Hour | 60 hours | Torque | 3.1 to 3.7 Nm |
| --- | --- | --- | --- |
| Oil Temperature | 90 to 105° C. | Inlet temperature | 25 to 35° C. |
| Cooling Water Temperature | 85 to 95° C. | Rpm | 800 to 3,000 |

After an intake valve was separated from an engine, washed with normal-heptane, and dried, its weight was measured in 0.01 mg units, and it was then reinstalled for conducting the test. After the 60 hour test, deposits on the bottom surface were removed after separating the valve. After removing materials dissolved in normal-heptane by washing with normal-heptane and drying, the weight was measured. At this time, the difference of valve weight between before and after the test was taken as the weight of the deposit formed for the test.

EXAMPLE 3

The Intake Valve Deposit and Combustion Chamber Deposit Test of Gasoline Engine The intake valve deposit and combustion chamber deposit test was undertaken in the same method as in the above after preparing a fuel oil concentrate by mixing a hydropolyoxypropylene oxyalkyl amine compound prepared in the PREPARATION EXAMPLE 15 with xylene in an amount of 50% by weight and adding 600 ppm by weight of fuel oil concentrate to commercial unleaded gasoline which did not contain a detergent.

COMPARATIVE EXAMPLE 4

The Intake Vvalve Deposit and Combustion Chamber Deposit Test of Gasoline Engine The intake valve deposit and combustion chamber deposit test was undertaken in the same method as in the EXAMPLE 3 after preparing a fuel oil concentrate by mixing a hydroxyalkyl amine compound prepared in the PREPARATION EXAMPLE 10 with xylene in an amount of 50% by weight and adding 400 ppm by weight of fuel oil concentrate to commercial unleaded gasoline which did not contain a detergent.

COMPARATIVE EXAMPLE 5

The Intake Valve Deposit and Combustion Chamber Deposit Test of Gasoline Engine The intake valve deposit and combustion chamber deposit test was undertaken in the same method as in the EXAMPLE 3 using commercial unleaded gasoline which did not contain a detergent.

After the test, an intake valve and combustion chamber precipitate production amount was determined and it is represented in the following Table 5.

TABLE 5

| Test | Addition amount (ppm by weight) | Deposits on intake Valve (mg/valve) | Deposits in the combustion chamber (/ΔII) | |
| --- | --- | --- | --- | --- |
| | | | Piston crown | Cylinder head |
| EXAMPLE 3 | 600 | 5.5 | 90.6 | 86.2 |
| COMPARATIVE EXAMPLE 4 | 400 | 5.6 | 99.2 | 102.4 |
| COMPARATIVE EXAMPLE 5 | 0 | 137.6 | 66.2 | 79.5 |

In case of adding a detergent of the present invention to a gasoline fuel, a much lesser amount of intake valve deposits were produced as compared with a non additive fuel (Comparative Example 5) in which a detergent was not added, and a similar amount of intake valve deposits as compared with conventional detergent added gasoline was produced.

However, deposits formed in the combustion chamber were decreased in comparison with the gasoline containing the concentrate of Comparative Examples. This shows that the detergent of the present invention has an excellent detergency for the intake valves and combustion chambers of gasoline engines.

As described in the above, the amount of the intake valve deposits of motors was remarkably decreased and that of the combustion chamber deposits was also decreased as compared to existing detergents (Comparative Example 4) in case of adding a fuel detergent of the present invention to a gasoline fuel. Therefore, motor driving performance is improved, amounts of harmful exhaust gas are decreased, and breakdowns can be prevented in case of adding a fuel detergent of the present invention to a gasoline fuel.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A hydropolyoxyalkylene oxyalkyl amine compound represented in the following Chemical Formula 1 as a fuel oil detergent:

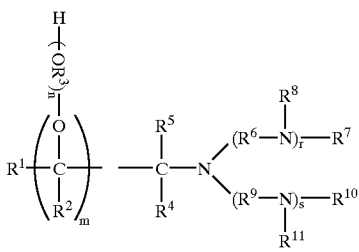

where m is an integer from 1 to 10;
n is an integer from 1 to 80;
r and s, each of which can be the same or different, are each independently an integer from 0 to 10;
$R^1$ is an alkyl derived from a polyolefin having a molecular weight from 200 to 5,000;
$R^2$, $R^4$, and $R^5$, each of which can be the same or different, are each independently hydrogen or an alkyl having 1 to 10 carbon atoms;
$R^3$, as a repetition unit of polymer chains which can be the same or different between repetition units, is an alkylene having 2 to 10 carbon atoms;
$R^6$ and $R^9$, each of which can be the same or different, are each independently hydrocarbons selected from aromatic chains having 6 to 10 carbon atoms or alkylenes having 2 to 10 carbon atoms; and
$R^7$, $R^8$, $R^{10}$, and $R^{11}$, each of which can be the same or different, are each independently hydrogen, hydrocarbons selected from aromatic chains having 6 to 10 carbon atoms, alkyls having 1 to 10 carbon atoms, or hydropolyoxyalkylene of the following Chemical Formula 2:

 [Chemical Formula 2]

where p is an integer from 0 to 80; and
$R^{12}$, as a repetition unit of a polymer chain which can be the same or different between repetition units, is a hydrocarbon selected from aromatic chains having 6 to 10 carbon atoms or alkylene having 2 to 10 carbon atoms.

2. A hydropolyoxyalkylene oxyalkyl amine compound in accordance with claim 1, wherein $R^1$ of the Chemical Formula 1 is an alkyl derived from a polyolefin which is prepared from isobutylene or a $C_4$ distillate containing isobutylene.

3. A hydropolyoxyalkylene oxyalkyl amine compound in accordance with claim 2, wherein the polyolefin molecular weight is from 200 to 2,500.

4. A hydropolyoxyalkylene oxyalkyl amine compound in accordance with claim 1, wherein $R^3$, $R^6$, $R^9$, and $R^{12}$ of the Chemical Formula 1, each of which can be the same or different, are each independently an alkylene having 2 to 5 carbon atoms.

5. A hydropolyoxyalkylene oxyalkyl amine based fuel oil concentrate, wherein 10 to 80% by weight of the hydropolyoxyalkylene oxyalkyl amine compound of claim 1 is contained in an aliphatic or aromatic organic solvent, of which the boiling point is in a range from 65 to 205 °C.

6. A hydrocarbon fuel oil composition comprising a hydropolyoxyalkylene oxyalkyl amine compound of claim 1.

7. A hydrocarbon fuel oil composition in accordance with claim 6, wherein the boiling point of the hydrocarbon fuel oil composition is in a range between a boiling point of gasoline and that of diesel fuel.

8. A hydrocarbon fuel oil composition in accordance with claim 6, wherein the hydrocarbon fuel oil composition comprises 50 to 5,000 ppm by weight of the hydropolyoxyalkylene oxyalkyl amine compound of claim 1.

9. A process for preparing a hydropolyoxyalkylene oxyalkyl amine compound, wherein the hydropolyoxyalkylene oxyalkyl amine compound of claim 1 is prepared by reacbng hydroxyalkyl amine represented as in the following Chemical Formula 3 with alkyleneoxide having 2 to 10 carbon atoms under catalysts of alkali metal compounds:

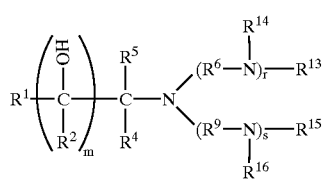 [Chemical Formula 3]

where m is an integer from 1 to 10;
r and s, each of which can be the same or different, are each independently an integer from 0 to 10;
$R^1$ is an alkyl derived from a polyolefin having a molecular weight from 200 to 5,000;
$R^2$, $R^4$, and $R^5$, each of which can be the same or different, are each independently hydrogen or an alkyl having 1 to 10 carbon atoms;
$R^6$ and $R^9$, each of which can be the same or different, are each independently hydrocarbons selected from aromatic chains having 6 to 10 carbon atoms or alkylenes having 2 to 10 carbon atoms; and
$R^{13}$, $R^{14}$, $R^{15}$, and $R^{16}$, each of which can be the same or different, are each independently hydrogen, hydrocarbons selected from aromatic chains having 6 to 10 carbon atoms, alkyls having 1 to 10 carbon atoms, or hydroxyalkyls of the following Chemical Formula 4:

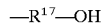 [Chemical Formula 4]

where $R^{17}$ of the Chemical Formula 4 is a hydrocarbon selected from aromatic chains having 6 to 10 carbon atoms or an alkylene having 1 to 10 carbon atoms.

10. A process for preparing a hydropolyoxyalkylene oxyalkyl amine compound in accordance with claim 9, wherein the alkyleneoxide is alkyleneoxide having 2 to 5 carbon atoms.

* * * * *